US011918996B2

(12) United States Patent
Thompson et al.

(10) Patent No.: US 11,918,996 B2
(45) Date of Patent: Mar. 5, 2024

(54) INTEGRATED CARTRIDGE FOR SAMPLE HOMOGENIZATION AND NUCLEIC ACID FRAGMENTATION

(71) Applicant: GeneCapture, Inc., Huntsville, AL (US)

(72) Inventors: Greg Thompson, Scottsboro, AL (US); Zachary McGee, Huntsville, AL (US); Paula Millirons, Owens Cross Roads, AL (US)

(73) Assignee: GeneCapture, Inc., Huntsville, AL (US)

( * ) Notice: Subject to any disclaimer, the term of this patent is extended or adjusted under 35 U.S.C. 154(b) by 275 days.

(21) Appl. No.: 16/848,306

(22) Filed: Apr. 14, 2020

(65) Prior Publication Data

US 2020/0324284 A1 Oct. 15, 2020

Related U.S. Application Data

(60) Provisional application No. 62/834,039, filed on Apr. 15, 2019.

(51) Int. Cl.
*B01L 3/00* (2006.01)

(52) U.S. Cl.
CPC ......... *B01L 3/502* (2013.01); *B01L 2200/147* (2013.01); *B01L 2300/0663* (2013.01);
(Continued)

(58) Field of Classification Search
CPC ............... B01L 3/502; B01L 2200/147; B01L 2300/0663; B01L 2300/1894; B01L 2400/0436; B01L 2300/1805
See application file for complete search history.

(56) References Cited

U.S. PATENT DOCUMENTS 6,090,054 A * 7/2000 Tagishi .............. A61H 23/0245 601/2
2001/0012612 A1* 8/2001 Petersen ................. B01L 3/502 435/5

(Continued)

FOREIGN PATENT DOCUMENTS

WO 2017/218858 12/2017
WO 2020/150553 7/2020

OTHER PUBLICATIONS

GDmini2—Ultrasonic Inline Micro-Reactor Hielscher. Published online Jul. 3, 2015. www.hielscher.com/gdmini2-ultrasonic-inline-micro-reactor.htm.

*Primary Examiner* — Matthew D Krcha
*Assistant Examiner* — Tingchen Shi
(74) *Attorney, Agent, or Firm* — Meunier Carlin & Curfman LLC

(57) ABSTRACT

Integrated cartridges for sample homogenization, nucleic acid fragmentation, and nucleic acid detection are disclosed herein. The integrated cartridges include a main housing having a sample well and a detection chamber and a sonication feature coupled to and extending outwardly from the main housing. The sonication feature includes a sonication chamber for receiving a sample fluid. A fluidic path directs the sample fluid from the sample well, to the sonication chamber, and to the detection chamber. Systems for use with the integrated cartridges can include sonotrodes with openings for positioning the sonication feature and/or temperature sensors for monitoring the temperature of the sonication feature. Methods include moving the sample fluid from the sample well to the sonication feature, transmitting ultrasonic energy into the sample fluid, moving the sample fluid from
(Continued)

the sonication feature to the detection chamber, and performing a nucleic acid detection assay within the detection chamber.

18 Claims, 10 Drawing Sheets

(52) U.S. Cl.
CPC .................. *B01L 2300/1805* (2013.01); *B01L 2300/1894* (2013.01); *B01L 2400/0436* (2013.01)

(56) References Cited

U.S. PATENT DOCUMENTS

| | | | | |
|---|---|---|---|---|
| 2003/0217840 | A1* | 11/2003 | Oldenburg | B01L 3/50853 165/253 |
| 2004/0112973 | A1* | 6/2004 | Tanaka | G05D 22/02 236/44 C |
| 2011/0177603 | A1* | 7/2011 | Ninomiya | G01N 29/043 422/62 |
| 2014/0024822 | A1* | 1/2014 | Connolly | C12Q 1/6806 536/25.4 |
| 2015/0130463 | A1* | 5/2015 | Wellman | B01L 3/502 324/321 |
| 2016/0023174 | A1* | 1/2016 | Felden | B01F 31/80 366/108 |
| 2018/0031592 | A1* | 2/2018 | Dority | B01L 3/561 |

* cited by examiner

INTEGRATED CARTRIDGE FOR SAMPLE HOMOGENIZATION AND NUCLEIC ACID FRAGMENTATION

RELATED APPLICATIONS

This application claims priority to U.S. Provisional Application No. 62/834,039, filed Apr. 15, 2019, which is hereby incorporated by reference in its entirety.

STATEMENT REGARDING FEDERALLY SPONSORED RESEARCH OR DEVELOPMENT

This invention was made, in part, with Government Support under STTR contract HDTRA1-18-C-0031. The Government has certain rights in the invention.

FIELD

This invention relates to point of care diagnostics, and more particularly to devices and methods for sample preparation.

BACKGROUND

Methods of detecting specific nucleic acids are of ever-increasing importance in the fields of molecular biology, diagnostics, and medicine. There currently exist several methods for detecting and identifying nucleic acids within biological samples. The reasons for selecting one method over another are varied, and include, among others, the cost or availability of reagents or equipment, the transportability and storage of the reagents or equipment, the desire to minimize the time spent or the number of steps, the accuracy or sensitivity for a certain application, the ease of analysis, the ability to automate the process, and the number of nucleic acids to be simultaneously targeted.

There are multiple applications for the detection of nucleic acids in the art, and new applications are always being developed. The ability to detect and quantify nucleic acids is useful in detecting and identifying organisms or pathogens, in determining gene expression levels in organisms, or in determining the levels of small RNAs, such as small interfering RNAs (siRNAs), and thus affects many fields, including human and veterinary medicine, food processing, and environmental testing.

Laboratory-based nucleic acid detection techniques typically require one or more steps to prepare a sample to be analyzed. Sample preparation can include a method to cause cells to rupture (sample homogenization) and to break the nucleic acid into shortened lengths (fragmentation) desired for detection. To achieve repeatable test results, it is desirable to use fragmentation methods that result in statistically uniform sizes within a controllable tolerance that can be used for quantitative analysis. Homogenization and fragmentation steps are typically performed manually, and as entire separate steps from the subsequent nucleic acid detection assay.

In some cases, such as during an epidemic, pandemic, or in a war zone, it can be important to perform nucleic acid detection immediately and/or at the site of sample collection. However, it can be difficult to perform sample preparation methods at these points of care because they require trained laboratory personnel and specialized equipment, which may not be available.

SUMMARY

Point of care nucleic acid detection would benefit from integration of sample preparation steps. This invention describes a method and practical implementations of devices which accomplish automated and integrated sample homogenization and nucleic acid fragmentation. The ability to perform sample preparation in the same cartridge as nucleic acid detection allows for automation that could save time and facilitate use by medical staff of all experience levels. The devices described herein are compact, portable, and able to provide sample-in/answer-out, affordable, point of care (POC) testing in a variety of medical facilities including but not limited to healthcare practitioner offices, emergency rooms, urgent care centers, pharmacy clinics, and in the field (for example, disaster zones, conflict zones, refugee camps, outbreak zones, and/or remote areas with limited access to a centralized healthcare system).

Integrated cartridges for sample homogenization, nucleic acid fragmentation, and nucleic acid detection include a main housing having a sample well and a detection chamber. The integrated cartridges further include a sonication feature coupled to and extending outwardly from the main housing. The sonication feature includes a sonication chamber for receiving a sample fluid. A fluidic path directs the sample fluid from the sample well, to the sonication chamber, and to the detection chamber. In some embodiments, the main housing moves the sample fluid through the integrated cartridge (which can contain, for example, from about 1 mL to about 200 mL of fluid). In some embodiments, the integrated cartridge is configured to be inserted into a nucleic acid detection reader.

The sonication feature of the integrated cartridge can be coupled to a sonotrode. The extension of the sonication feature outwardly from the main housing of the cartridge spaces the sonotrode from the main housing to limit coupling ultrasonic energy to the main housing. In some embodiments, the sonication feature includes a sonication conduit, and the sonication chamber is the channel of the sonication conduit. The sonication conduit can be formed of metal, for example. In some embodiments, the sonication feature comprises at least one sonication container, and the sonication chamber is the inside of the sonication container. The sonication container can be formed of a polymer, for example. In some embodiments, inert beads are housed within the sonication container or conduit.

In some embodiments, the sonication feature receives an ultrasound coupling fluid. The sonication feature may include a coupling fluid well for receiving the ultrasound coupling fluid. The coupling fluid (and/or the coupling fluid well) at least partially surrounds the sonication conduit or the sonication container of the sonication feature.

In some embodiments, the sonication feature includes a coupling for connection to the main housing. The coupling can include a chamber entrance that receives an unhomogenized sample fluid from the main housing and a chamber exit that delivers sonicated sample fluid back to the main housing. The chamber entrance and chamber exit are located within the fluidic path that extends through the main housing and the sonication feature. The sonication feature can also include a vent tube for equalizing pressure within the sonication feature. The vent tube can be part of the coupling between the sonication feature and the main housing. In some embodiments, the vent tube includes a filter.

In some embodiments, the sonication feature is monitored by a temperature sensor. A system can include a processor in communication with the temperature sensor, a cooling mechanism, and a heating mechanism. The processor monitors readings from the temperature sensor and executes computer readable instructions to cool the sonication feature via the cooling mechanism if a reading from the temperature sensor falls above a predetermined value, and to heat the sonication feature via the heating mechanism if a reading from the temperature sensor falls below a predetermined value. In some embodiments, the cooling mechanism cools a coupling fluid and the heating mechanism heats a coupling fluid. In some embodiments, the cooling mechanism moves cooled air over the sonication feature, and the heating mechanism moves heated air over the sonication feature.

Some embodiments include a sonotrode that defines an opening for positioning the sonication feature. The opening can be configured to at least partially surround the sonication conduit (or the sonication container). In some embodiments, the opening can be a well configured to contain a coupling fluid. In some embodiments, the sonotrode is coupled to, or monitored by, a reader that monitors and controls the temperature of the sonotrode in response to readings from a temperature sensor located within the reader or on the surface of the sonotrode.

Methods of performing sample homogenization, nucleic acid fragmentation, and nucleic acid detection using an integrated cartridge include: moving a sample fluid from the sample well to the sonication feature; transmitting ultrasonic energy into the sample fluid; moving the sample fluid from the sonication feature to the detection chamber; and performing a nucleic acid detection assay within the detection chamber. Some methods include regulating the temperature of sample fluid within the sonication feature (for example, by heating or cooling a coupling fluid surrounding the sample fluid). Some methods include dissipating ultrasonic energy using inert beads housed within the sonication chamber. Some methods include inserting the sonication feature into a sonotrode. In some embodiments, transmission of ultrasonic energy into the sample fluid occurs as the sample fluid moves continuously through the sonication feature. In some embodiments, sample fluid is subjected to ultrasonic energy in bulk volumes which are then routed from the sonication feature to the detection chamber.

DESCRIPTION OF DRAWINGS

The device is explained in even greater detail in the following drawings. The drawings are merely exemplary and certain features may be used singularly or in combination with other features. The drawings are not necessarily drawn to scale.

(FIG. 11A) 176 ng/microliter and (FIG. 11B) 238 ng/microliter. The Y-axis is fragmentation units, and the X-axis is nucleotide length.

DETAILED DESCRIPTION

Figure 1:
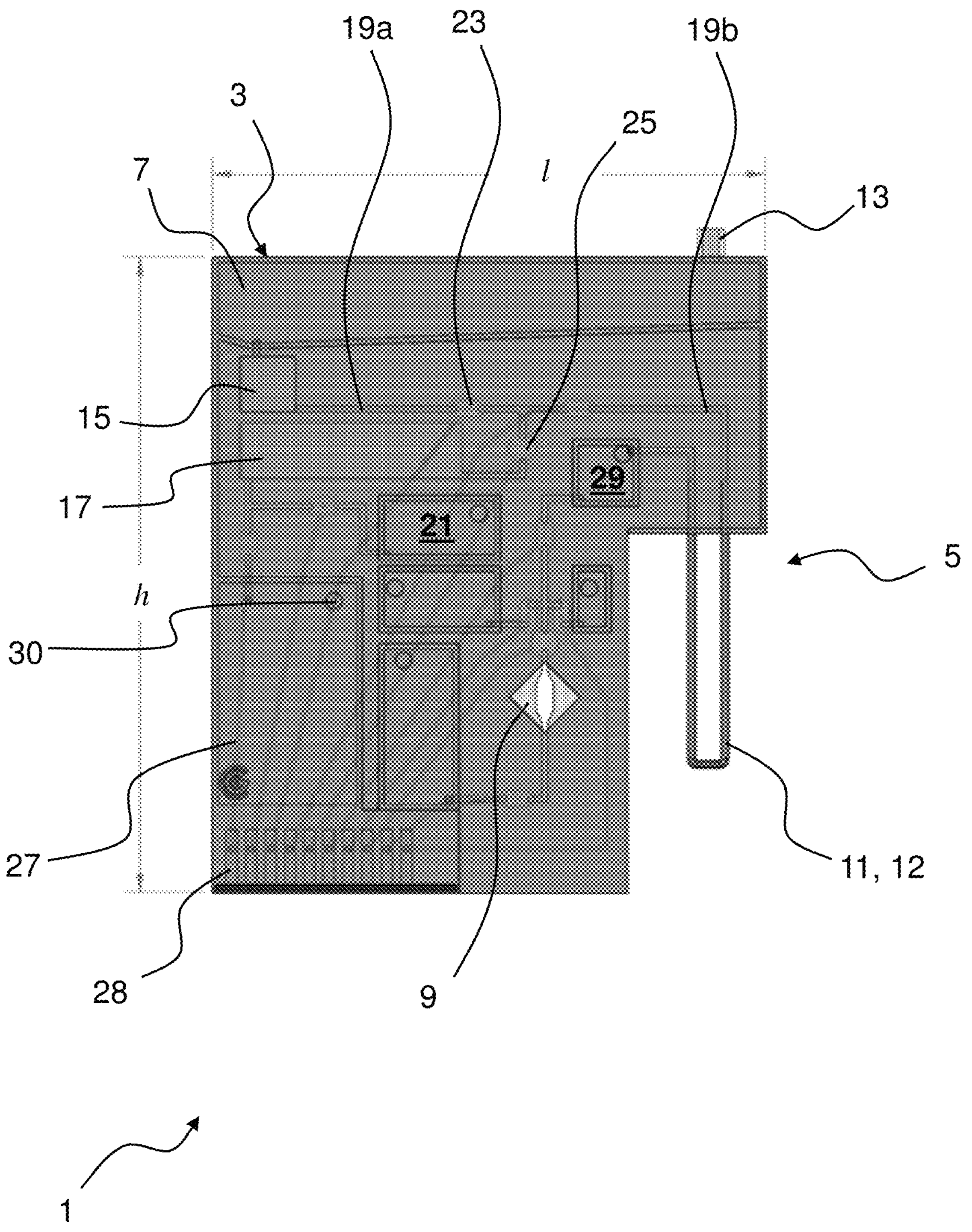
FIG. 1 shows a front cross-sectional view of an embodiment of an integrated cartridge.

The following description of certain examples of the inventive concepts should not be used to limit the scope of the claims. Other examples, features, aspects, embodiments, and advantages will become apparent to those skilled in the art from the following description. As will be realized, the device and/or methods are capable of other different and obvious aspects, all without departing from the spirit of the inventive concepts. Accordingly, the drawings and descriptions should be regarded as illustrative in nature and not restrictive.

For purposes of this description, certain aspects, advantages, and novel features of the embodiments of this disclosure are described herein. The described methods, systems, and apparatus should not be construed as limiting in any way. Instead, the present disclosure is directed toward all novel and nonobvious features and aspects of the various disclosed embodiments, alone and in various combinations and sub-combinations with one another. The disclosed methods, systems, and apparatus are not limited to any specific aspect, feature, or combination thereof, nor do the disclosed methods, systems, and apparatus require that any one or more specific advantages be present or problems be solved.

Features, integers, characteristics, compounds, chemical moieties, or groups described in conjunction with a particular aspect, embodiment or example of the invention are to be understood to be applicable to any other aspect, embodiment or example described herein unless incompatible therewith. All of the features disclosed in this specification (including any accompanying claims, abstract, and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract, and drawings), or to any novel one, or any novel combination, of the steps of any method or process so disclosed.

Throughout this application, various publications and patent applications are referenced. The disclosures of these publications in their entireties are hereby incorporated by reference into this application in order to more fully describe the state of the art to which this disclosure pertains. However, it should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. The terms "about" and "approximately" are defined as being "close to" as understood by one of ordinary skill in the art. In one non-limiting embodiment the terms are defined to be within 10%. In another non-limiting embodiment, the terms are defined to be within 5%. In still another non-limiting embodiment, the terms are defined to be within 1%.

"Optional" or "optionally" means that the subsequently described event or circumstance may or may not occur, and that the description includes instances where said event or circumstance occurs and instances where it does not.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal aspect. "Such as" is not used in a restrictive sense, but for explanatory purposes.

The term "sample" refers to a tissue (e.g., tissue biopsy), organ, cell (including a cell maintained in culture), cell lysate (or lysate fraction), biomolecule derived from a cell or cellular material (e.g. a polypeptide or nucleic acid), or body fluid from a subject. Non-limiting examples of body fluids include blood, urine, plasma, serum, tears, lymph, bile, cerebrospinal fluid, interstitial fluid, aqueous or vitreous humor, colostrum, sputum, amniotic fluid, saliva, anal and vaginal secretions, perspiration, semen, transudate, exudate, and synovial fluid. A sample will include nucleic acids.

Homogenization is a process whereby different fractions of a sample become equal in composition. A homogenized sample is equal in composition throughout, so that removing a fraction does not alter the overall molecular make-up of the sample remaining and is identical to the fraction removed.

Sonication is the act of applying sound or ultrasound energy to agitate particles in a sample. In biological applications, sonication can be used to homogenize a sample, disrupt cellular membranes (cell lysis), release cellular contents, and fragment nucleic acid molecules. The nucleic acid molecules subjected to sonication are sheared into smaller fragments (fragmentation).

Sonotrodes, also known as ultrasonic horns or ultrasonic probes, are devices configured to emit ultrasonic waves in order to apply vibrational energy to a sample. A sonotrode can include, for example, a stack of piezoelectric transducers attached to a tapering rod. The end of the rod is applied to the sample or to an intermediate material that couples the ultrasonic energy to the sample. The entire sonotrode acts as a resonator, vibrating lengthwise with standing waves at its resonant frequency. Frequencies typically used with ultrasonic sonotrodes range from about 20 kHz to about 70 kHz, and the amplitude of the vibration typically ranges from about 13 micrometers to about 130 micrometers. Sonotrode rods can be made of, for example, titanium, aluminum or steel, with or without heat treatment. The shape of the end of the sonotrode rod (for example, round, square, cylindrical, with or without teeth, profiled) can be optimized for the needs of a particular application and affects the characteristics of vibratory energy released.

The term "nucleic acid" refers to a natural or synthetic molecule comprising a single nucleotide or two or more nucleotides linked by a phosphate group at the 3' position of one nucleotide to the 5' end of another nucleotide. The nucleic acid is not limited by length, and thus the nucleic acid can include deoxyribonucleic acid (DNA) or ribonucleic acid (RNA).

The methods disclosed herein utilize sonication to homogenize and fragment the nucleic acid of a sample in preparation for nucleic acid detection. The devices disclosed herein provide a closed loop fluidics path for the sample. The invention facilitates integration of the homogenization and nucleic acid fragmentation into a cartridge or point of care device which performs any of a number of additional sample preparation steps and analysis steps. Such a point of care device could also be utilized to perform nucleic acid detection methods and target sensitivity testing methods such as those described in International Application No. PCT/US2017/037806 (Published as International Publication No. WO 2017/218858) and in International Application No. PCT/US2020/013996, each of which is incorporated by reference in its entirety.

FIG. 1 shows an integrated cartridge 1 for sample homogenization, nucleic acid fragmentation, and nucleic acid detection. The integrated cartridge 1 includes a main housing 3 and a sonication feature 5. The sonication feature 5 is coupled to the main housing 3 and extends outwardly therefrom. The main housing includes a sample well 7 and a detection chamber 9. The sonication feature 5 includes a sonication chamber or channel 11 configured to receive a sample fluid. A fluidic path directs a sample fluid from the sample well 7, through the sonication chamber or channel 11, and to the detection chamber 9. The cartridge 1 will also include various other components. For example, the cartridge example shown in FIG. 1 routes the sample fluid from an inlet 13, to the sample well 7, through a pre-filter 15, and to filter 17. After the initial filtering, the sample is rinsed back into the cartridge conduit 19 using buffer housed in a buffer reservoir 21. Valves 23, pumps 25, fluid or pneumatic lines 19, 27, ports 28, and vents 30, are included throughout the main housing 3 to facilitate and direct sample flow through the cartridge 1. Valves can be solenoid, fluid, air pressure, or vacuum actuated, for example.

The sample travels from the filter stack 17 to the sonication feature 5 and enters sonication chamber, or sonication channel 11, for homogenization and fragmentation. A sonication chamber or channel can be any closed feature capable of containing sample fluid during homogenization and fragmentation. In the embodiment shown in FIG. 1, the sonication channel 11 is the interior lumen of a sonication conduit 12. Sonication conduit 12 fluidically couples to cartridge conduit 19*b*, allowing for continuous flow of the sample fluid through the sonication feature 5. After homogenization and fragmentation, the sample travels to the collection reservoir 29, and then to the detection chamber 9.

Figure 2:
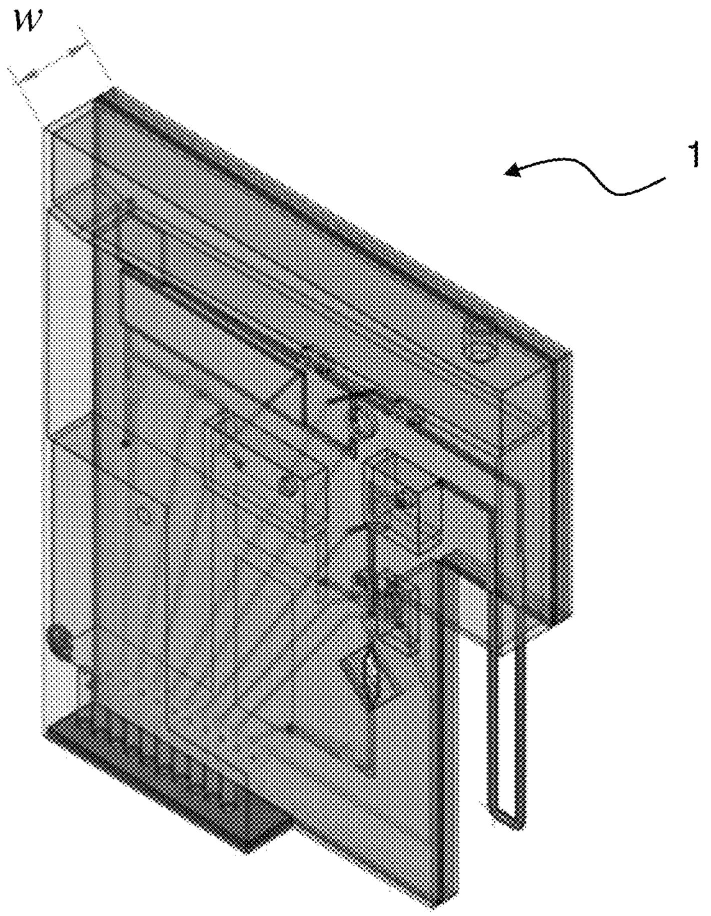
FIG. 2 shows a perspective view of the embodiment of FIG. 1.
Figure 3:
FIG. 3 shows a reader.

The cartridge is configured to be inserted into a nucleic acid detection reader. The size of the cartridge can be scaled up or down, but will be small enough to be portable, shippable, inexpensive and disposable. Typically, an integrated cartridge 1 is configured to contain from about 1 mL to about 200 mL of sample fluid. As a non-limiting example, the integrated cartridge 1 shown in FIG. 1 has a length l of about 100 millimeters, a height h of about 115 millimeters, and a width w of about 13 millimeters (as shown in the perspective view in FIG. 2). The integrated cartridge 1 can be configured to be inserted into a nucleic acid detection reader, such as reader 150 shown in FIG. 3, for point-of-care diagnosis.

Figure 4A:
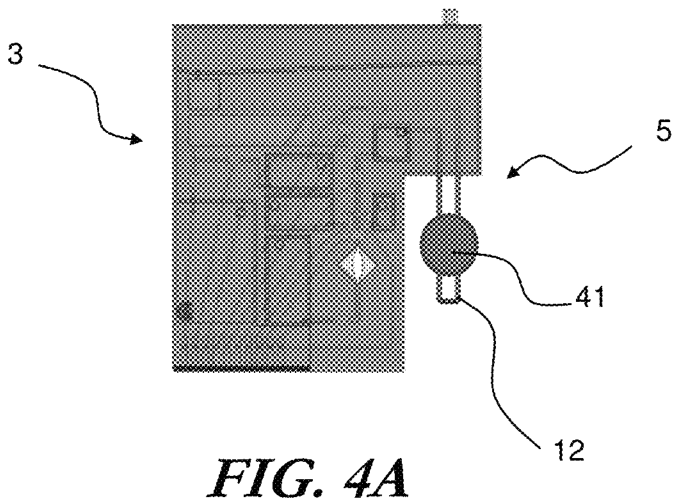
FIG. 4A shows a front cross-sectional view of an embodiment of an integrated cartridge coupled to a sonotrode.

The sample is homogenized and fragmented within the sonication channel 11 of the sonication feature 5. As shown in FIG. 4A, the sonication feature 5 can be coupled to a sonotrode 41, for example, via sonication conduit 12. The sonication conduit can be formed of any material capable of forming a fluidic channel and coupling ultrasonic energy to the sample flowing through the conduit. Example materials include metals (such as, but not limited to, stainless steel and brass) or other materials such as glass or silicon. The extension of the sonication feature 5 outwardly from the main housing 3 spaces the sonotrode 41 from the main housing 3 to limit the coupling of ultrasonic energy to the main housing 3.

Figure 4B:
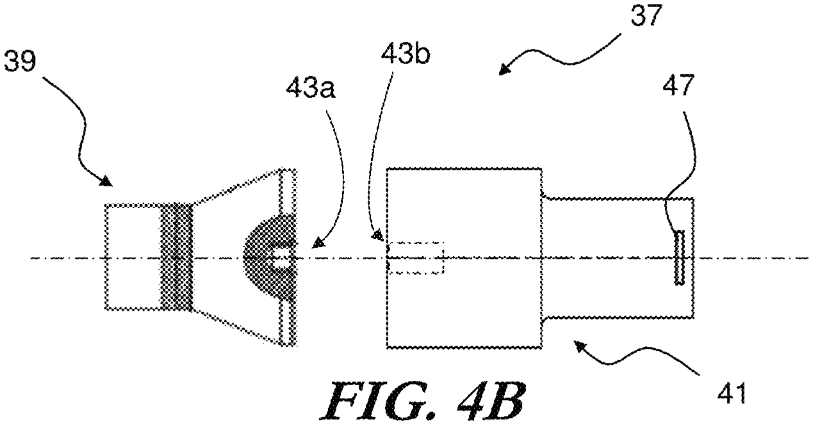
FIG. 4B shows an exploded, top-down view of a sonotrode and transducer.

An example sonotrode configuration is shown in FIG. 4B. The transducer includes a transducing element, such as, for example, a piezoelectric element. The transducer 39 and the sonotrode 41 connect at coupling 43 (transducer coupling 43*a*, sonotrode coupling 43*b*). The coupling 43 can be, for example, a threaded rod configured to fit into a threaded hole, or any coupling that enables energy from transducer 39 to be delivered to sonotrode 41. The sonotrode 41 shown in FIG. 4B includes an opening, or slot 47. The shape of the opening in the sonotrode can be varied to suit the configuration of the sonication feature 5. As shown in the side view of FIG. 4C, sonication conduit 12 is inserted into slot or hole 47 of sonotrode 41 in order to couple ultrasonic energy from the sonotrode 41 to the sonication feature 5.

Figure 5A:
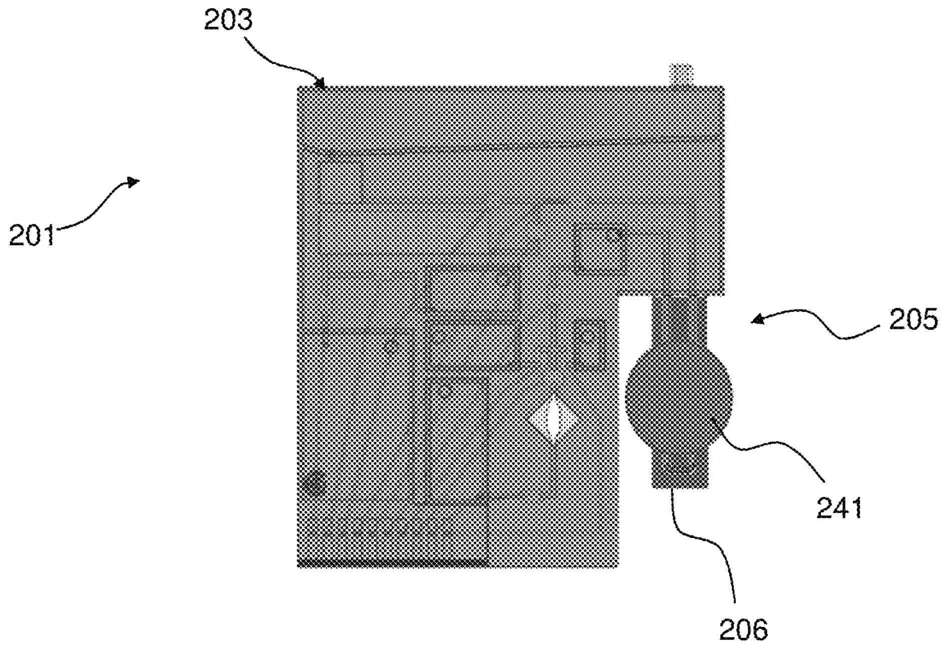
FIG. 5A shows a front cross-sectional view of another embodiment of an integrated cartridge indirectly coupled to a sonotrode.
Figure 5B:
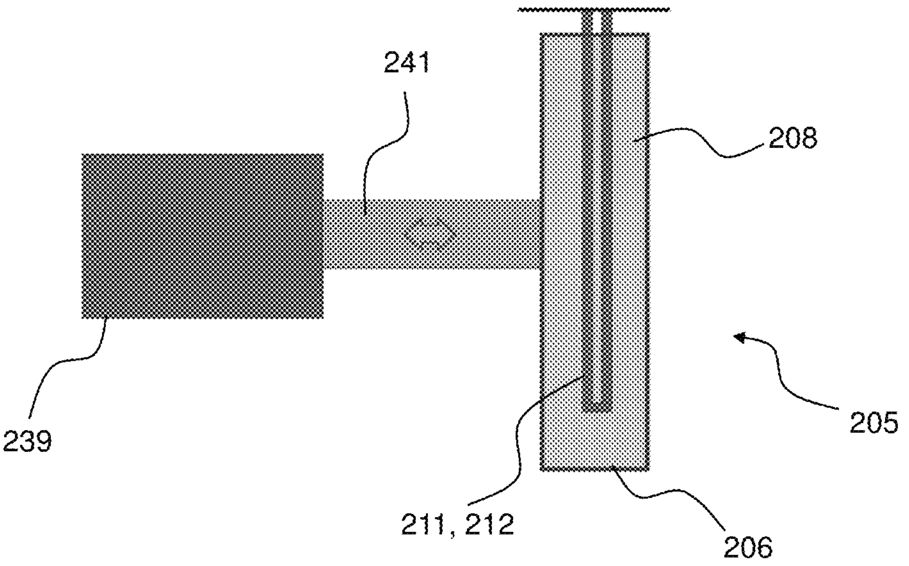
FIG. 5B shows a side view of a sonotrode indirectly coupled to the embodiment shown in FIG. 5A.

FIGS. 5A and 5B show an alternative embodiment of an integrated cartridge 201 coupled to a sonotrode 241. Sonication feature 205 of cartridge 201 includes a coupling fluid well 206. Sonication conduit 212 routes sample fluid from the main housing 203 into the coupling fluid well 206 for homogenization and fragmentation. Coupling fluid well 206 contains an ultrasound coupling fluid 208 that surrounds sonication conduit 212. The coupling fluid 208 is efficient at transmitting ultrasonic energy from the sonotrode 241 to the sonication conduit 212 and therefore, to the sample fluid located within the sonication channel 211. In some embodiments, a coupling fluid well can be formed within the sonotrode 241, and the sonication feature can be inserted into the well.

Transmission of ultrasonic energy can cause heating of the sample fluid within the sonication feature. This can make detection of nucleic acids more difficult, can alter concentrations of sample within the sample fluid, and/or can desiccate the sample fluid altogether. It can be advantageous, therefore, to regulate the temperature of the sonication feature to preserve the sample and maintain a consistent sample concentration. In some embodiments, the sonication feature can include a temperature sensor. Alternatively, the sonication feature can include one or more monitoring features that allow it to be read by a temperature sensor located within a reader 150 such as the one shown in FIG. 3. Monitoring features can be, for example, surface characteristics that enable infrared monitoring, or physical features such as geometry to allow for the contact of a thermometer. A processor within the reader 150 monitors the readings from the temperature sensor and controls temperature regulation devices, such as cooling or heating mechanisms. This enables the temperature of the sonication feature to be regulated if the temperature readings fall above or below predetermined values. In some embodiments, such as the one shown in FIGS. 5A and 5B, the heating or cooling mechanism can control temperature of the ultrasound coupling fluid 208 to maintain a consistent temperature around sample conduit 212. Alternatively, heating and cooling can be accomplished via flow of heated or cooled air around the sonication conduit 212. In another embodiment the sonotrode 241 can be heated/cooled.

Figure 6:
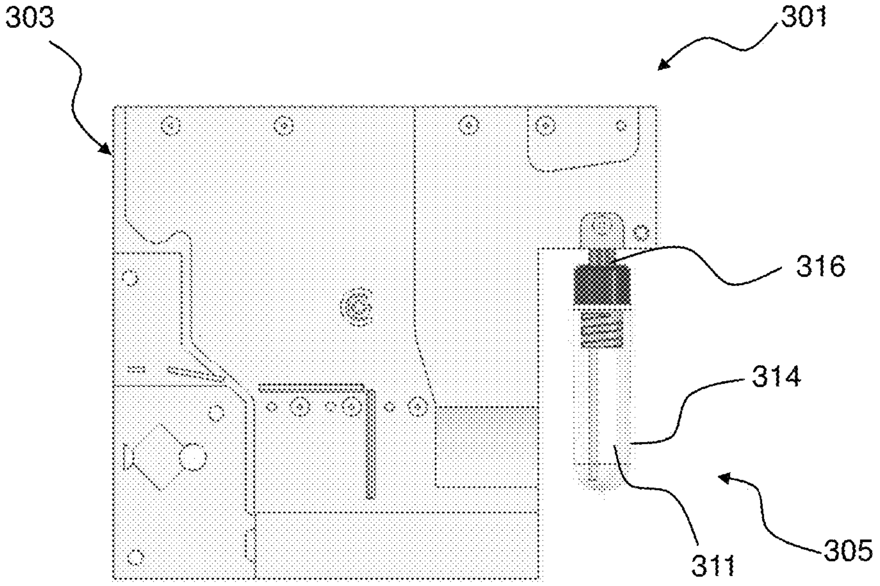
FIG. 6 shows a front view of another embodiment of an integrated cartridge.
Figure 7:
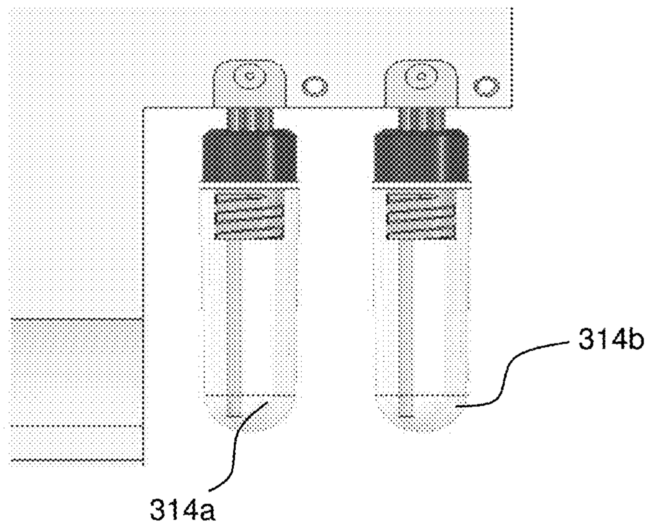
FIG. 7 shows the sonication feature of another embodiment of an integrated cartridge.
Figure 8:
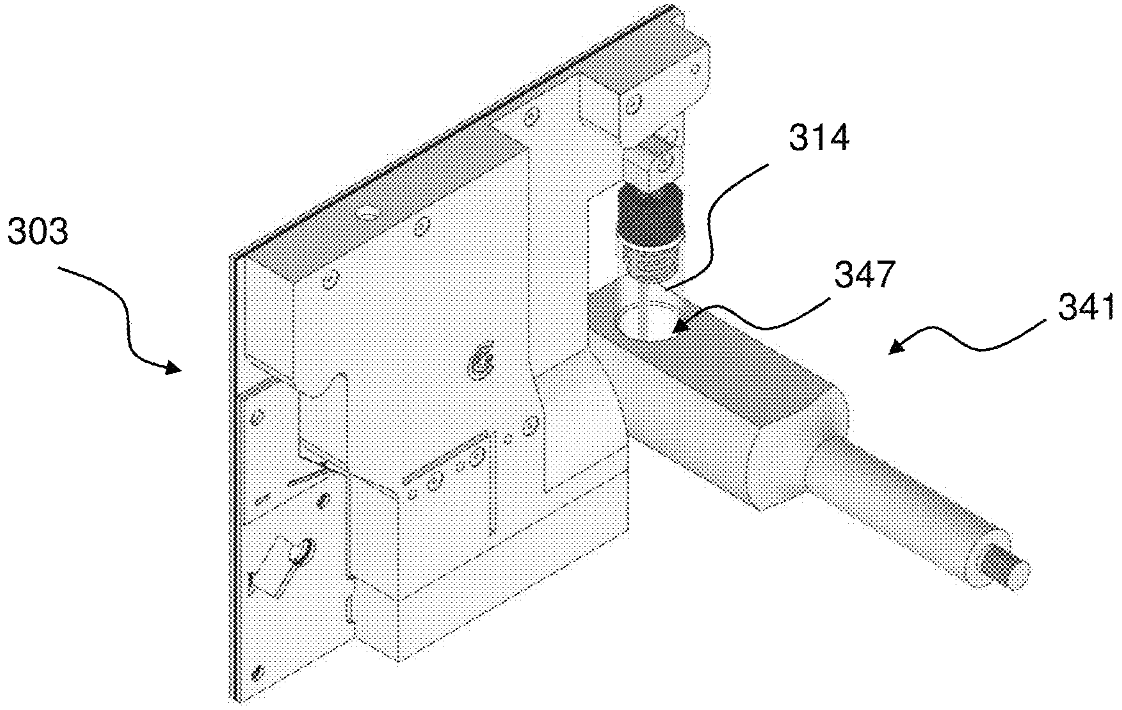
FIG. 8 shows the embodiment of FIG. 6 coupled to a sonotrode.

FIG. 6 shows an alternative embodiment of an integrated cartridge 301. The sonication feature 305 of integrated cartridge 301 includes a sonication container 314 and a coupling 316 that connects the sonication container 314 to the main housing 303. During use, sample fluid fills the inside (the sonication chamber 311) of the sonication container 314. The sample fluid within sonication chamber 311 is homogenized and the nucleic acid is fragmented. The sonication container 314 is then drained of sample fluid, which is routed to the detection chamber as described above. FIG. 7 shows another alternative embodiment of an integrated cartridge wherein bulk sonication of sample fluid can be performed in parallel using multiple sample containers 314*a*, 314*b*. FIG. 8 shows an example sonotrode 341 having an opening 347 into which sonication chamber 314 can be inserted.

In some embodiments, inert beads can be housed within the sonication container 314 to increase fragmentation during sonication. For example, the beads can be zirconium beads.

Sonication containers 314 can be formed of inexpensive molded or formed materials, such as, but not limited to, polymers. Temperature regulation systems similar to those described above can be included to maintain a consistent temperature of a sample fluid inside sonication chamber 314. For example, temperature control can be accomplished by cooling or heating a coupling fluid in a well attached to the main housing 303 and surrounding the sonication container 314. Alternatively, heating and cooling can be accomplished via flow of heated or cooled air around the sonication container 314. In another embodiment, such as the one shown in FIG. 8, the sonotrode 341 can be heated or cooled, or a coupling fluid contained within a coupling fluid well on the sonotrode (opening 347) can be heated or cooled.

Figure 9:
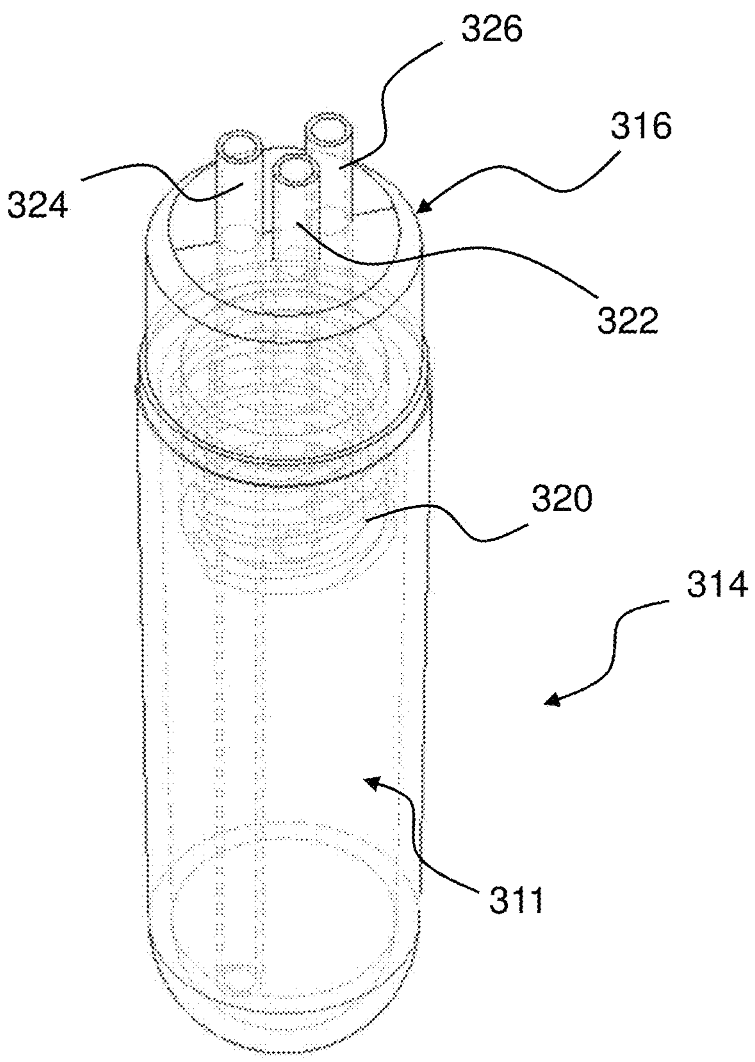
FIG. 9 shows a sonication container.
Figure 10:
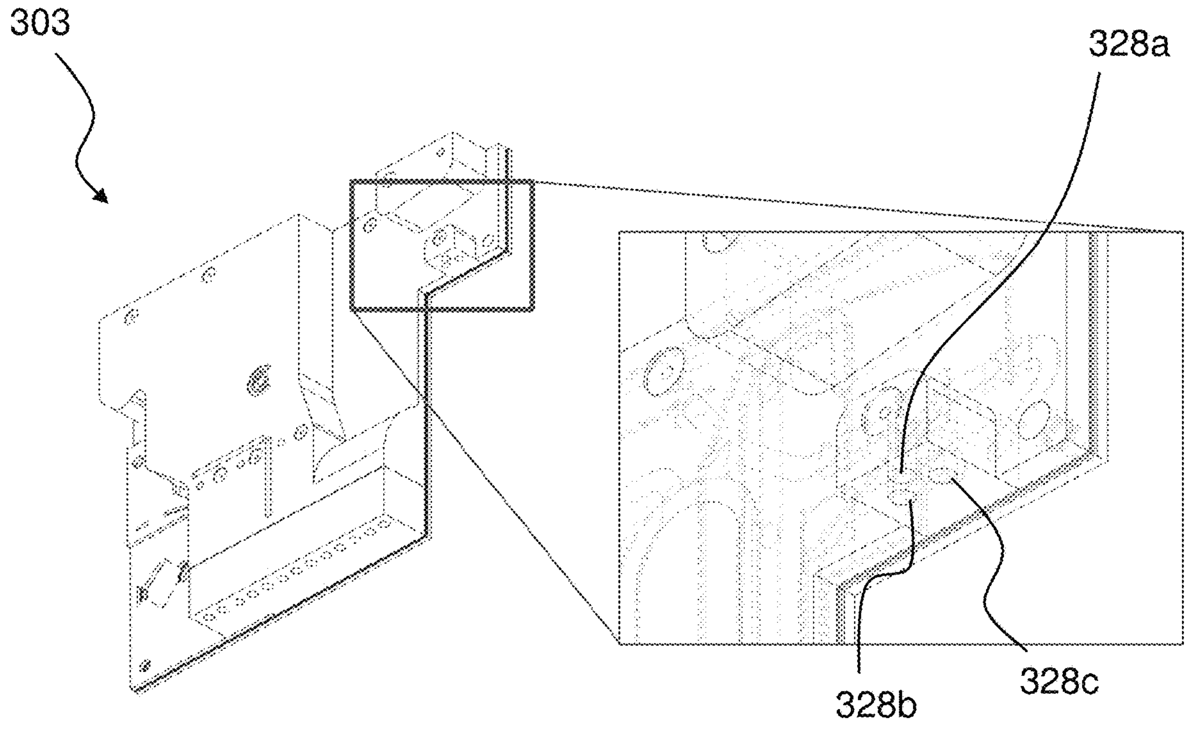
FIG. 10 shows openings of a main housing for coupling with a sonication container.

FIG. 9 shows a sonication container 314 including the coupling 316 for connection to the main housing 303. Coupling 316 includes a gasket 320 with openings to extend fluidic connections between the cartridge conduit and the sonication chamber 311. For example, the container 314 shown in FIG. 9 includes a chamber entrance 322 that receives an unhomogenized sample fluid from the main housing 303 and a chamber exit 324 that delivers sonicated sample fluid back to the main housing 303. A vent tube 326 can also be included, for example to equalize pressure within the sonication container 314. The vent tube 326 can include a filter for trapping pathogens within the sonication container 314. Openings 328*a*, 328*b*, and 328*c* for connection of the sonication coupling openings to the main housing 303 are shown in FIG. 10.

Figure 4C:
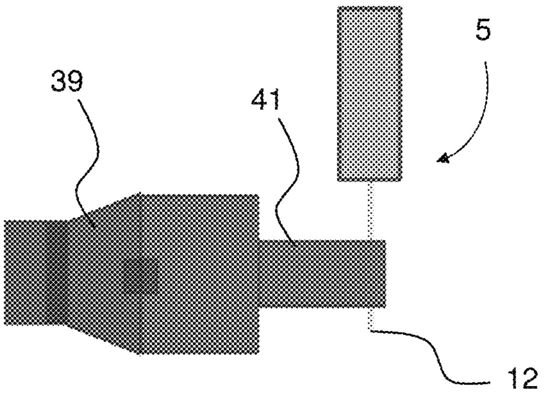
FIG. 4C shows a side view of a sonotrode coupled to a sonication feature.

As described briefly above, methods of performing sample homogenization, nucleic acid fragmentation, and nucleic acid detection include; moving a sample fluid from the sample well, such as sample well 7 shown in FIG. 1, to a sonication feature 5; sonicating the sample fluid; moving the sample fluid from the sonication feature 5 to the detection chamber 9; and performing a nucleic acid detection assay. In some embodiments, the method includes regulating the temperature of a sample fluid within the sonication feature using heating and cooling mechanisms and a processor located within a reader 150. The processor monitors readings from a temperature sensor and executes computer readable instructions to cool the sonication feature via the cooling mechanism if a reading from the temperature sensor falls above a predetermined value, and to heat the sonication feature via the heating mechanism if a reading from the temperature sensor falls below a predetermined value. In some embodiments, regulating the temperature further comprises heating or cooling a coupling fluid surrounding the sample fluid, as shown in FIGS. 5A and 5B. Beads may be incorporated into sonication containers such as those shown in FIGS. 6 and 7, and in this scenario, transmitting ultrasonic energy into the sample fluid further comprises dissipating ultrasonic energy using inert beads housed within the sonication chamber. Methods further include inserting the sonication feature into a sonotrode. For example, the sonication conduit 12 shown in FIG. 4C is inserted into the slot 47 of sonotrode 41, and the sonication container 314 of the sonication feature shown in FIG. 8 is inserted into opening 347 of sonotrode 341. Transmission of ultrasonic energy into the sample fluid can occur continuously as the sample fluid moves continuously through the sonication feature as shown in FIG. 1. Alternatively, sample fluid can be subjected to ultrasonic energy in bulk volumes such as is shown in FIGS. 6 and 7.

EXAMPLE

Figure 11A:
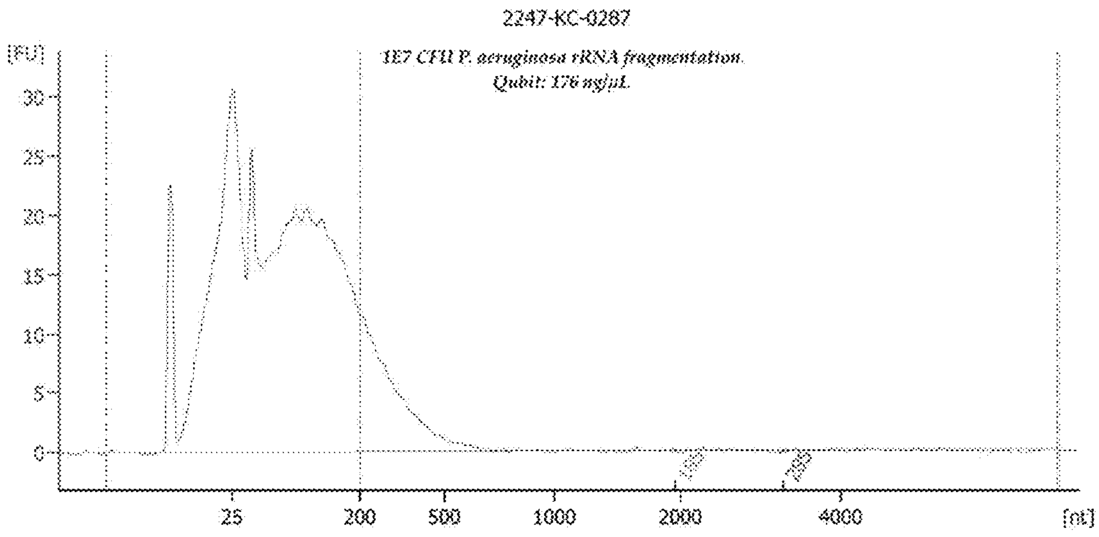
FIG. 11A and FIG. 11B show electrophoreograms demonstrating fragmentation of nucleic acids utilizing the devices and methods disclosed herein at two different nucleic acid concentrations.
Figure 11B:
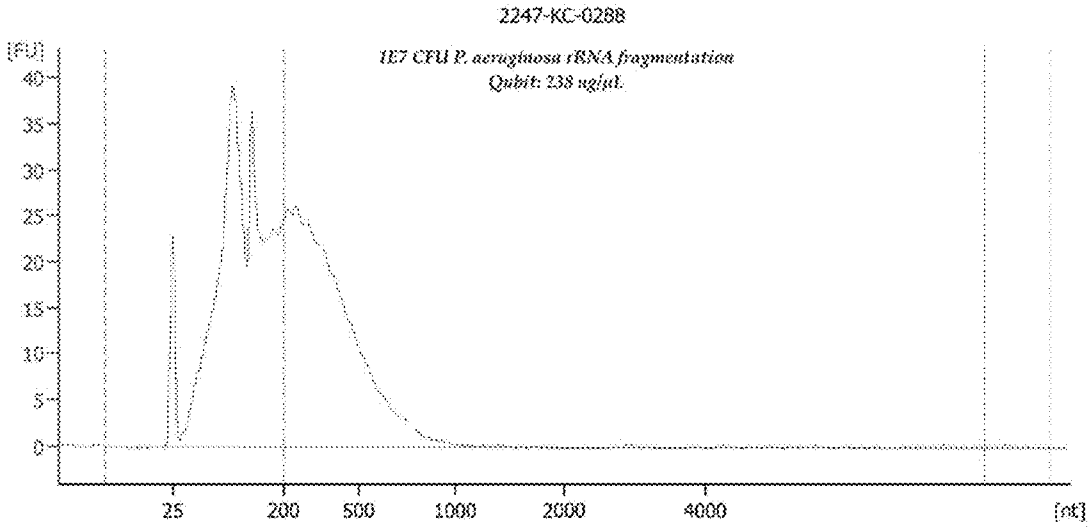

FIG. 11A and FIG. 11B show two electrophoreograms displaying the results of a nucleic acid fragmentation analysis (two different runs, using two different starting concentrations). Utilizing the homogenization and fragmentation method described herein results in fragment lengths appropriate for the hybridization and nucleic acid detection process. The graphs show a mean fragment length of 150-250 nt with no notable signal intensity from the whole rRNA strands, indicating complete fragmentation of the nucleic acids contained within the lysate. This fragment length distribution can be controlled for increased target diffusion within solution while retaining target sequence availability and viability. The analysis was performed using a BioAnalyzer (Agilent).

While the invention has been described with reference to particular embodiments and implementations, it will be understood that various changes and additional variations may be made and equivalents may be substituted for elements thereof without departing from the scope of the invention or the inventive concept thereof. Certain aspects and features of any given embodiment may be translated to other embodiments described herein. In addition, many modifications may be made to adapt a particular situation or device to the teachings of the invention without departing from the essential scope thereof. Therefore, it is intended that the invention not be limited to the particular implementations disclosed herein, but that the invention will include all implementations falling within the scope of the appended claims.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

What is claimed is:

1. An integrated cartridge for sample homogenization, nucleic acid fragmentation, and nucleic acid detection, the integrated cartridge comprising:

a main housing comprising a sample inlet, a sample well, and a detection chamber, the sample inlet comprising a lumen, the lumen extending between an outer surface of the integrated cartridge and the sample well;

a sonication feature comprising a sonication chamber configured to receive a sample fluid, the sonication feature extending sufficiently outwardly from the main housing to space the sonication chamber from the main housing;

wherein the sonication feature is suspended from the main housing by a coupling positioned between the main housing and the sonication feature, the coupling comprising a gasket and at least one conduit extending therethrough; and a fluidic path for directing a sample fluid through the integrated cartridge, the fluidic path originating at the sample inlet and extending through the sample well, through the gasket and into the sonication chamber, back through the gasket and into the main housing, and through the detection chamber.

2. The integrated cartridge of claim 1, wherein the integrated cartridge is configured to be inserted into a nucleic acid detection reader.

3. The integrated cartridge of claim 1, wherein the integrated cartridge is configured to contain from 1 mL to 200 mL of fluid.

4. The integrated cartridge of claim 1, wherein when the sonication feature is coupled to a sonotrode, the sonication feature extending sufficiently outwardly from the main housing limits coupling of ultrasonic energy to the main housing.

5. The integrated cartridge of claim 1, wherein the sonication feature comprises at least one sonication container, and the sonication chamber is the inside of the sonication container.

6. The integrated cartridge of claim 5, further comprising a plurality of beads housed within the sonication container.

7. The integrated cartridge of claim 1, wherein the sonication feature is configured to receive an ultrasound coupling fluid.

8. The integrated cartridge of claim 7, wherein the sonication feature further comprises a sonication conduit or a sonication container, and the coupling fluid at least partially surrounds the sonication conduit or the sonication container.

9. The integrated cartridge of claim 8, wherein the sonication feature further comprises a coupling fluid well, and the sonication conduit or sonication container is at least partially surrounded by the coupling fluid well.

10. The integrated cartridge of claim 1, wherein the coupling comprises a chamber entrance that receives an unhomogenized sample fluid from the main housing and a chamber exit that delivers sonicated sample fluid back to the main housing, the chamber entrance and chamber exit located within the fluidic path.

11. The integrated cartridge of claim 1, wherein the sonication feature further comprises a vent tube for equalizing pressure within the sonication feature.

12. The integrated cartridge of claim 1, wherein the main housing further comprises a filter.

13. A system for sample homogenization, nucleic acid fragmentation, and nucleic acid detection, the system comprising:

an integrated cartridge comprising:

a main housing comprising a sample well and a detection chamber;

a generally cylindrical sonication container housing a plurality of inert beads and configured to receive a sample fluid, the sonication container coupled to the main housing at an entrance to the sonication container and protruding outwardly therefrom;

a fluidic path for directing a sample fluid from a sample well, to the sonication container, and to the detection chamber, the system further comprising;

a temperature sensor configured to monitor the temperature of the sonication container; and a processor in communication with the temperature sensor, a cooling mechanism, and a heating mechanism;

wherein the processor is configured to monitor readings from the temperature sensor and execute computer readable instructions to cool the sonication container via the cooling mechanism if a reading from the temperature sensor falls above a predetermined value, and to heat the sonication container via the heating mechanism if a reading from the temperature sensor falls below a predetermined value.

14. The system of claim 13, wherein the cooling mechanism cools a coupling fluid and the heating mechanism heats a coupling fluid.

15. The system of claim 13, wherein the cooling mechanism moves cooled air over the sonication container and the heating mechanism moves heated air over the sonication container.

16. A system for sample homogenization, nucleic acid fragmentation, and nucleic acid detection, the system comprising:

an integrated cartridge comprising:

a main housing comprising a sample well and a detection chamber;

an elongate sonication feature comprising a sonication chamber configured to receive a sample fluid, the elongate sonication feature coupled to the main housing and extending sufficiently outwardly from the main housing to space the sonication chamber from the main housing; and a fluidic path for directing a sample fluid from a sample well, to the sonication chamber, and to the detection chamber;

the system further comprising a sonotrode defining an opening;

wherein in an assembled configuration the elongate sonication feature of the cartridge is inserted into the opening of the sonotrode.

17. The system of claim 16, wherein the opening is a well configured to contain a coupling fluid.

18. The system of claim 16, wherein the sonotrode is coupled to a reader that monitors and controls the temperature of the sonotrode in response to readings from a temperature sensor located within the reader.

* * * * *